United States Patent
Yagi et al.

(10) Patent No.: US 7,505,536 B2
(45) Date of Patent: Mar. 17, 2009

(54) ENERGY DISPERSAL CIRCUIT AND RECEIVER

(75) Inventors: Tetsuya Yagi, Katano (JP); Tomohiro Kimura, Hirakata (JP)

(73) Assignee: Panasonic Corporation, Kadoma-shi (JP)

( * ) Notice: Subject to any disclaimer, the term of this patent is extended or adjusted under 35 U.S.C. 154(b) by 635 days.

(21) Appl. No.: 11/012,088

(22) Filed: Dec. 15, 2004

(65) Prior Publication Data

US 2005/0179570 A1 Aug. 18, 2005

(30) Foreign Application Priority Data

Dec. 19, 2003 (JP) ............................. 2003-422716

(51) Int. Cl.
*H03D 1/00* (2006.01)
(52) U.S. Cl. .................. 375/340; 375/353; 375/260; 375/236; 375/316; 341/126; 341/60; 725/70
(58) Field of Classification Search ................. 375/340, 375/324, 316, 257, 239, 260, 353, 236; 332/106; 341/126, 60, 187; 725/70
See application file for complete search history.

(56) References Cited

U.S. PATENT DOCUMENTS

| 4,811,394 A | 3/1989 | Ragavan et al. | |
| 5,454,009 A * | 9/1995 | Fruit et al. | 375/130 |
| 6,404,758 B1 * | 6/2002 | Wang | 375/343 |
| 7,209,455 B2 * | 4/2007 | Yee et al. | 370/310.1 |
| 2004/0091059 A1 * | 5/2004 | Chen | 375/269 |
| 2006/0133468 A1 * | 6/2006 | Chen et al. | 375/340 |

FOREIGN PATENT DOCUMENTS

| EP | 1 278 323 A | 1/2003 |
| JP | 10-334609 A | 12/1998 |
| JP | 2003-085874 A | 3/2003 |

OTHER PUBLICATIONS

"Receiver for Digital Broadcasting, ARIB Standard (Desirable Specifications)" Jul. 25, 2002, pp. 3-19, ARIB STD-B21 Version 3.2, Association of Radio Industries and Businesses, Japan.
"Receiver for Digital Broadcasting, ARIB Standard (Desirable Specifications)" Oct. 16, 2003, pp. 1-262, ARIB STD-B21 Version 4.2, Association of Radio Industries and Businesses, Japan.

* cited by examiner

*Primary Examiner*—Shuwang Liu
*Assistant Examiner*—Michael R Neff
(74) *Attorney, Agent, or Firm*—Smith Patent Office

(57) ABSTRACT

An energy dispersal circuit, which generates a PRBS (Pseudo Random Binary Sequence) and executes an XOR (exclusive-OR) operation with respect to a data signal and the PRBS based on a bit, includes a register value calculator for calculating a register value of a shift register based on inputted data and a packet number. The register value calculator has a bit divider for dividing the packet number from LSB to MSB, packet shift operators for bit-shifting an initial value of the shift register from $2^0$ bits to $2^{N-1}$ bits, and selectors for selecting inputs and outputs thereof.

14 Claims, 21 Drawing Sheets

FIG. 8

| Mode | M |
|---|---|
| Mode 1 | 1 |
| Mode 2 | 2 |
| Mode 3 | 4 |

FIG. 9

| Carrier Modulation | Sx |
|---|---|
| (D)QPSK | 2 |
| 16 QAM | 4 |
| 64 QAM | 6 |

FIG. 10

| Carrier Modulation | S'x = Sx/2 |
|---|---|
| (D)QPSK | 1 |
| 16QAM | 2 |
| 64QAM | 3 |

FIG. 11

| Convolution coding rate | R'x = Rx × 24 |
|---|---|
| 1/2 | 12 |
| 2/3 | 16 |
| 3/4 | 18 |
| 5/6 | 20 |
| 7/8 | 21 |

FIG. 17

| | 64 bits shift | B0 | B1 | B2 | B3 | B4 | B5 | B6 | B7 | B8 | B9 | B10 | B11 | B12 | B13 | B14 |
|---|---|---|---|---|---|---|---|---|---|---|---|---|---|---|---|---|
| b0 | 1000000000000000 | 0 | 0 | 0 | 0 | 1 | 0 | 0 | 0 | 1 | 0 | 0 | 0 | 0 | 0 | 0 |
| b1 | 0100000000000000 | 0 | 0 | 0 | 0 | 0 | 1 | 0 | 0 | 0 | 1 | 0 | 0 | 0 | 0 | 0 |
| b2 | 0010000000000000 | 0 | 0 | 0 | 0 | 0 | 0 | 1 | 0 | 0 | 0 | 1 | 0 | 0 | 0 | 0 |
| b3 | 0001000000000000 | 0 | 0 | 0 | 0 | 0 | 0 | 0 | 1 | 0 | 0 | 0 | 1 | 0 | 0 | 0 |
| b4 | 0000100000000000 | 0 | 0 | 0 | 0 | 0 | 0 | 0 | 0 | 1 | 0 | 0 | 0 | 1 | 0 | 0 |
| b5 | 0000010000000000 | 0 | 0 | 0 | 0 | 0 | 0 | 0 | 0 | 0 | 1 | 0 | 0 | 0 | 1 | 0 |
| b6 | 0000001000000000 | 1 | 0 | 0 | 0 | 0 | 0 | 0 | 0 | 0 | 0 | 1 | 0 | 0 | 0 | 1 |
| b7 | 1100000000000000 | 1 | 1 | 0 | 0 | 0 | 0 | 0 | 0 | 0 | 0 | 0 | 1 | 0 | 0 | 0 |
| b8 | 0110000000000000 | 0 | 1 | 1 | 0 | 0 | 0 | 0 | 0 | 0 | 0 | 0 | 0 | 1 | 0 | 0 |
| b9 | 0011000000000000 | 0 | 0 | 1 | 1 | 0 | 0 | 0 | 0 | 0 | 0 | 0 | 0 | 0 | 1 | 0 |
| b10 | 1001100000000000 | 1 | 0 | 0 | 1 | 1 | 0 | 0 | 0 | 0 | 0 | 0 | 0 | 0 | 0 | 0 |
| b11 | 1100110000000000 | 1 | 1 | 0 | 0 | 1 | 1 | 0 | 0 | 0 | 0 | 0 | 0 | 0 | 0 | 0 |
| b12 | 0110011000000000 | 0 | 1 | 1 | 0 | 0 | 1 | 1 | 0 | 0 | 0 | 0 | 0 | 0 | 0 | 0 |
| b13 | 0011001100000000 | 0 | 0 | 1 | 1 | 0 | 0 | 1 | 1 | 0 | 0 | 0 | 0 | 0 | 0 | 0 |
| b14 | 0001100010000000 | 0 | 0 | 0 | 1 | 1 | 0 | 0 | 1 | 0 | 0 | 0 | 0 | 0 | 0 | 0 |

FIG. 18

| | |
|---|---|
| $B_0$ | $b_6 + b_7 + b_{10} + b_{11}$ |
| $B_1$ | $b_7 + b_8 + b_{11} + b_{12}$ |
| $B_2$ | $b_8 + b_9 + b_{12} + b_{13}$ |
| $B_3$ | $b_9 + b_{10} + b_{13} + b_{14}$ |
| $B_4$ | $b_0 + b_{10} + b_{11}$ |
| $B_5$ | $b_1 + b_{11} + b_{12}$ |
| $B_6$ | $b_2 + b_{12} + b_{13}$ |
| $B_7$ | $b_3 + b_{13} + b_{14}$ |
| $B_8$ | $b_0 + b_4$ |
| $B_9$ | $b_1 + b_5$ |
| $B_{10}$ | $b_2 + b_6$ |
| $B_{11}$ | $b_3 + b_7$ |
| $B_{12}$ | $b_4 + b_8$ |
| $B_{13}$ | $b_5 + b_9$ |
| $B_{14}$ | $b_6 + b_{10}$ |

FIG. 19
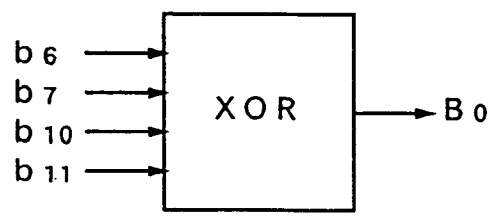
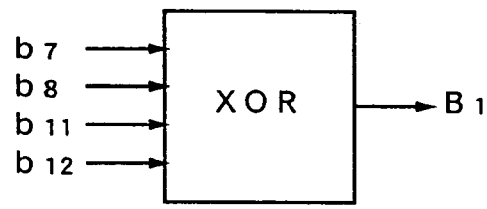
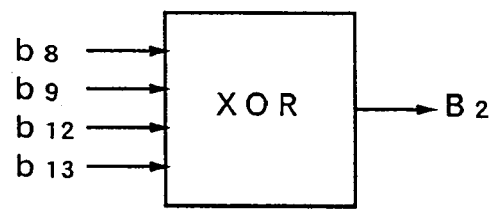
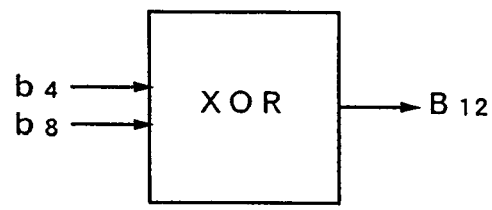
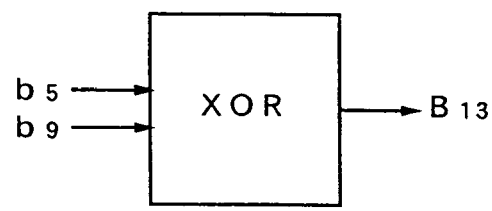
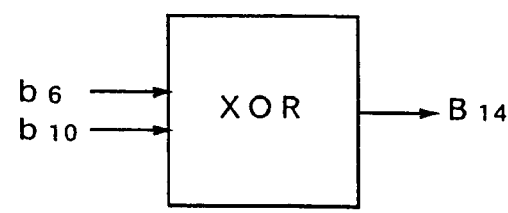

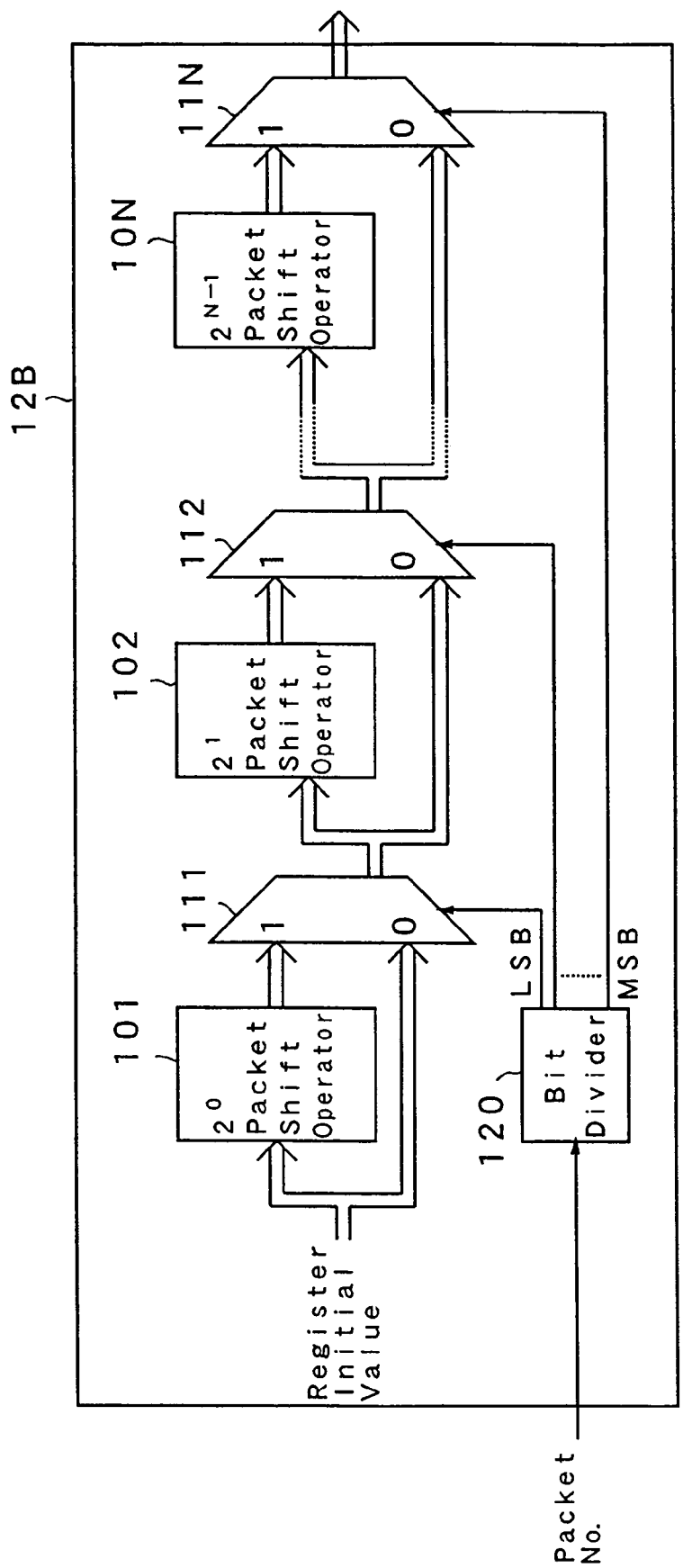
F I G. 2 0

FIG. 21

| N | No. of packets | No. of bits | mod 32767 |
|---|---|---|---|
| 0 | 1 | 1632 | 1632 |
| 1 | 2 | 3264 | 3264 |
| 2 | 4 | 6528 | 6528 |
| 3 | 8 | 13056 | 13056 |
| 4 | 16 | 26112 | 26112 |
| 5 | 32 | 52224 | 19457 |
| 6 | 64 | 104448 | 6147 |
| 7 | 128 | 208896 | 12294 |
| 8 | 256 | 417792 | 24588 |
| 9 | 512 | 835584 | 16409 |
| 10 | 1024 | 1671168 | 51 |
| 11 | 2048 | 3342336 | 102 |
| 12 | 4096 | 6684672 | 204 |
| 13 | 8192 | 13369344 | 408 |
| 14 | 16384 | 26738688 | 816 |
| 15 | 32768 | 53477376 | 1632 |

FIG. 22

| b_i | 15-bit | 51 bits shift | B0 | B1 | B2 | B3 | B4 | B5 | B6 | B7 | B8 | B9 | B10 | B11 | B12 | B13 | B14 |
|---|---|---|---|---|---|---|---|---|---|---|---|---|---|---|---|---|---|
| b0 | 100000000000000 | 000000111100000 | 0 | 0 | 0 | 0 | 0 | 0 | 1 | 1 | 1 | 1 | 0 | 0 | 0 | 0 | 0 |
| b1 | 010000000000000 | 000000011110000 | 0 | 0 | 0 | 0 | 0 | 0 | 0 | 1 | 1 | 1 | 1 | 0 | 0 | 0 | 0 |
| b2 | 001000000000000 | 000000001111000 | 0 | 0 | 0 | 0 | 0 | 0 | 0 | 0 | 1 | 1 | 1 | 1 | 0 | 0 | 0 |
| b3 | 000100000000000 | 000000000111100 | 0 | 0 | 0 | 0 | 0 | 0 | 0 | 0 | 0 | 1 | 1 | 1 | 1 | 0 | 0 |
| b4 | 000010000000000 | 000000000011110 | 0 | 0 | 0 | 0 | 0 | 0 | 0 | 0 | 0 | 0 | 1 | 1 | 1 | 1 | 0 |
| b5 | 000001000000000 | 100000000001111 | 1 | 0 | 0 | 0 | 0 | 0 | 0 | 0 | 0 | 0 | 0 | 1 | 1 | 1 | 1 |
| b6 | 000000100000000 | 010000000000111 | 0 | 1 | 0 | 0 | 0 | 0 | 0 | 0 | 0 | 0 | 0 | 0 | 1 | 1 | 1 |
| b7 | 000000010000000 | 001000000000011 | 0 | 0 | 1 | 0 | 0 | 0 | 0 | 0 | 0 | 0 | 0 | 0 | 0 | 1 | 1 |
| b8 | 000000001000000 | 000100000000001 | 0 | 0 | 0 | 1 | 0 | 0 | 0 | 0 | 0 | 0 | 0 | 0 | 0 | 0 | 1 |
| b9 | 000000000100000 | 100010000000000 | 1 | 0 | 0 | 0 | 1 | 0 | 0 | 0 | 0 | 0 | 0 | 0 | 0 | 0 | 0 |
| b10 | 000000000010000 | 010001000000000 | 0 | 1 | 0 | 0 | 0 | 1 | 0 | 0 | 0 | 0 | 0 | 0 | 0 | 0 | 0 |
| b11 | 000000000001000 | 001000100000000 | 0 | 0 | 1 | 0 | 0 | 0 | 1 | 0 | 0 | 0 | 0 | 0 | 0 | 0 | 0 |
| b12 | 000000000000100 | 000100010000000 | 0 | 0 | 0 | 1 | 0 | 0 | 0 | 1 | 0 | 0 | 0 | 0 | 0 | 0 | 0 |
| b13 | 000000000000010 | 000010001000000 | 0 | 0 | 0 | 0 | 1 | 0 | 0 | 0 | 1 | 0 | 0 | 0 | 0 | 0 | 0 |
| b14 | 000000000000001 | 000001111000000 | 0 | 0 | 0 | 0 | 0 | 1 | 1 | 1 | 1 | 0 | 0 | 0 | 0 | 0 | 0 |

FIG. 23

| | |
|---|---|
| $B_0$ | $b_5 + b_9$ |
| $B_1$ | $b_6 + b_{10}$ |
| $B_2$ | $b_7 + b_{11}$ |
| $B_3$ | $b_8 + b_{12}$ |
| $B_4$ | $b_9 + b_{13}$ |
| $B_5$ | $b_{10} + b_{14}$ |
| $B_6$ | $b_0 + b_{11} + b_{14}$ |
| $B_7$ | $b_1 + b_2 + b_{12} + b_{14}$ |
| $B_8$ | $b_0 + b_1 + b_2 + b_{13} + b_{14}$ |
| $B_9$ | $b_0 + b_1 + b_2 + b_3$ |
| $B_{10}$ | $b_1 + b_2 + b_3 + b_4$ |
| $B_{11}$ | $b_2 + b_3 + b_4 + b_5$ |
| $B_{12}$ | $b_3 + b_4 + b_5 + b_6$ |
| $B_{13}$ | $b_4 + b_5 + b_6 + b_7$ |
| $B_{14}$ | $b_5 + b_6 + b_7 + b_8$ |

ENERGY DISPERSAL CIRCUIT AND RECEIVER

BACKGROUND OF THE INVENTION

1. Field of the Invention

The present invention relates to an energy dispersal circuit used in a receiver for digital broadcast, and a receiver using the same.

2. Discussion of the Related Art

There are various transmission methods for digital broadcast, examples of which include ISDB-T (Integrated System Digital Broadcasting-Terrestrial) which is a Japanese terrestrial digital television broadcasting method, ISDB-TSB (Integrated System Digital Broadcasting-Terrestrial Sound Broadcasting) which is a Japanese terrestrial digital audio broadcasting method, ISDB-S (Integrated System Digital Broadcasting-Satellite) which is a Japanese satellite digital broadcasting method, DVB-T (Digital Video Broadcasting-Terrestrial) which is an European terrestrial digital television broadcasting method, and the like. One of processes commonly used in these transmission methods is energy dispersal (also called randomizing).

FIG. 1 illustrates a principal configuration of the energy dispersal circuit. In FIG. 1, an energy dispersal unit 201 has a PRBS generating section 202 for generating a pseudo random binary sequence (hereinafter, referred to as PRBS) and an XOR operating circuit 205 for executing exclusive-OR operation (hereinafter, referred to as XOR). The PRBS generating section 202 is configured by a 15-bit shift register 203 and an XOR operator 204. The XOR operating circuit 205 executes an XOR operation with respect to a data signal inputted to the energy dispersal unit 201 and a PRBS generated by the PRBS generating section 202. The energy dispersal unit 201 is provided on both transmitter and receiver sides and is used for substantially equalizing ratios of "0" and "1" in digital data to be transmitted. In the energy dispersal unit 201, a predetermined value is defined as an initial value of the shift register 203, and the shift register 203 is initialized at predetermined cycles. The initial value of the shift register 203 is, sequentially from a lower order (left side in the FIG. 1), "100101010000000", which is common in all of the ISDB-T, ISDB-T$_{SB}$, ISDB-S and DVB-T. The cycle at which the shift register 203 is initialized is one frame (approximately 53 milliseconds (hereinafter, ms) to approximately 257 ms) in the case of the ISDB-T and ISDB-T$_{SB}$, one super frame (approximately 10 ms) in the case of the ISDB-S and eight transport packets (approximately 70 microseconds (hereinafter, µs) to approximately 300 µs) in the case of DVB-T.

FIG. 2 is a block diagram illustrating a general configuration of a receiver for the Japanese digital television broadcast. In the figure, a satellite receiving antenna 301 and a terrestrial receiving antenna 302 are connected to a receiver 303. The receiver 303 in the figure can respond to both the satellite and terrestrial broadcasts, or may be an exclusive-use receiver for accepting inputs from only one of the antennas. As a different option, the receiver 303 may be constituted as a receiver capable of accepting inputs of broadcast waves through cables and the like and an input transport stream from an external apparatus. A video signal or an audio signal or both of those signals, which are obtained by the receiver 303, are outputted to a video/audio display device 304 to be displayed thereon. The receiver 303 can incorporate the video/audio display device 304 therein.

FIG. 3 is a block diagram illustrating a general configuration of the receiver 303. A satellite front end 401 receives a satellite receive signal and performs channel selection, demodulation and error correction thereto, and outputs a transport stream (hereinafter, referred to as TS). A terrestrial front end 402 receives a terrestrial receive signal and performs the channel selection, demodulation and error correction thereto, and outputs a TS. A video/audio decoder 403 receives any of the TS outputted from the satellite front end 401, TS outputted from the terrestrial front end 402 and TS inputted from the external apparatus, and converts it into the video signal and the audio signal.

FIG. 4 is a block diagram illustrating a general configuration of the terrestrial front end 402. The receive signal is channel-selected by a tuner 501 and is converted into a digital signal by an A/D converter 502. An orthogonal demodulating division 503 executes an orthogonal demodulation to the inputted digital signal and converts it into a base band OFDM signal. An FFT division 504 executes the fast Fourier transform to the signal from the orthogonal demodulating division 503 to convert the signal of time domain into a signal of frequency domain and then output it. A demodulating division 505 executes a synchronous demodulation or a differential demodulation to the signal from the FFT division 504 and outputs the demodulated signal. An error correcting division 506 executes an error-corrective decoding to the demodulated signal obtained from the demodulating division 505. A symbol synchronization division 507 detects transmission mode information and a symbol synchronization timing from the base band OFDM signal outputted from the orthogonal demodulating division 503. The symbol synchronization division 507 then supplies a symbol timing signal to the FFT division 504 and the demodulating division 505, and supplies the symbol timing signal and the transmission mode information to the error correcting division 506. A frame synchronization division 508 extracts control information included in the signal outputted from the FFT division 504 and detects a deviation generated from a leading position of a frame to a leading position of a symbol as a symbol number based on the control information. The frame synchronization division 508 then supplies the control information and the symbol number to the demodulating division 505 and the error correcting division 506.

The transmission mode information includes a mode (three kinds of 1, 2 and 3) for regulating a carrier interval in the transmitted OFDM symbol, and a guard interval length for regulating a length of a guard interval serving to alleviate multi-path interferences caused by reflected waves and the like. As the control information can be mentioned, in the case of the ISDB-T and ISDB-T$_{SB}$, for example, a signal called TMCC (Transmission and Multiplexing Configuration Control) signal for transmitting a configuration of a hierarchical transmission, a carrier modulation method per hierarchy, a rate of convolution coding per hierarchy, a time interleave length per hierarchy and the like.

FIG. 5 is a block diagram illustrating a general configuration of the error correcting division 506. A frequency/time deinterleave unit 601 executes a frequency and time deinterleave process. A demapping unit 602 extracts bit information from carrier information. A hierarchy dividing unit (HDU) 603 divides data in the case of the hierarchical transmission. Bit deinterleave units 604A, 604B and 604C execute a bit deinterleave process per divided hierarchy. Depuncture units (DPUs) 605A, 605B and 605C execute a bit interpolation in response to the convolution encoding rate per divided hierarchy. A TS regeneration unit 606 organizes the data of the respective hierarchies into packet units of a predetermined bit length (herein, 1632 bits=204 bytes). A Viterbi decoding unit 607 executes Viterbi decoding at a coding rate of ½. A hierarchy dividing unit (HDU) 608 executes the hierarchical division again. Byte deinterleave units 609A, 609B and 609C execute a byte deinterleave process per divided hierarchy. Energy dispersal units (EDU) 201A, 201B and 201C execute an energy dispersal process per divided hierarchy. A hierarchy synthesizing unit (HSU) 610 synthesizes the data of the respective divided hierarchies. An RS decoding unit 611 decodes a shortened Reed Solomon code (204, 188).

Next, the energy dispersal units 201A, 201B and 201C, which are configured in the same manner as the energy dispersal unit 201 described earlier, execute the XOR operation with respect to the data signal excluding a synchronization byte and the PRBS. Shift registers of the respective energy dispersal units 201A, 201B and 201C are operated including a period of the synchronization byte and are initialized per frame.

"Standard Specification for Digital Broadcast Receiver (desired specification)" see ARIBSTD-B21, 3.2 Issue, formulated on Jul. 25, 2002 by the Association of the Radio Industries and Businesses.

The conventional energy dispersal unit employed in the ISDB-T and the ISDB-$T_{SB}$ indispensably demands the initialization at the frame leading position. A time length from the start of a signal reception to the frame leading position is 0.5 frame on average and one frame at maximum, because a timing of starting the signal reception is generated irrelevant to the frame cycle. A time length corresponding to 0.5 frame is approximately 27 ms to approximately 129 ms. A time length corresponding to one frame is approximately 53 ms to approximately 257 ms. It is impossible to start the energy dispersal process during the time period, which results in the generation of a standby time before a correct receive signal is outputted.

The timing of the frame cycle is different in each view channel, which generates the standby time whenever the channel is switched over in viewing a broadcast. The problem led to the disadvantage that a considerable time length was required to provide such services as to display an image on a screen and output an audio in response to the switchover of the channel.

SUMMARY OF THE INVENTION

It is therefore an object of the present invention to provide an energy dispersal circuit capable of reducing a time length required for initialization of energy dispersal, which is a main cause of time delay generated when a channel is switched over, and a digital broadcast receiver using the same.

BRIEF DESCRIPTION OF THE DRAWINGS

FIG. 8 illustrates coefficients defined in accordance with transmission modes;

FIG. 9 illustrates coefficients defined in accordance with carrier modulation methods in X hierarchies;

FIG. 10 illustrates coefficients defined in accordance with the carrier modulation methods in the X hierarchies;

FIG. 11 illustrates ratios of convolution coding in the X hierarchies;

FIG. 17 illustrates a 64-bit shift operation;

FIG. 18 illustrates an operation logic for obtaining a register value after the 64-bit shift operation;

FIG. 19 is a block diagram illustrating a configuration of a $2^6$-bit shift operator;

FIG. 20 is a block diagram illustrating a second configuration of the register value calculator according to the embodiment of the present invention;

FIG. 21 illustrates how a packet number and a bit number correspond to each other and a residue operation for the bit number;

FIG. 22 is illustrates a bit shift operation of a $2^{10}$ packet shift operator;

FIG. 23 illustrates an operation logic after the bit shift operation; and

DESCRIPTION OF THE PREFERRED EMBODIMENT

Figure 1:
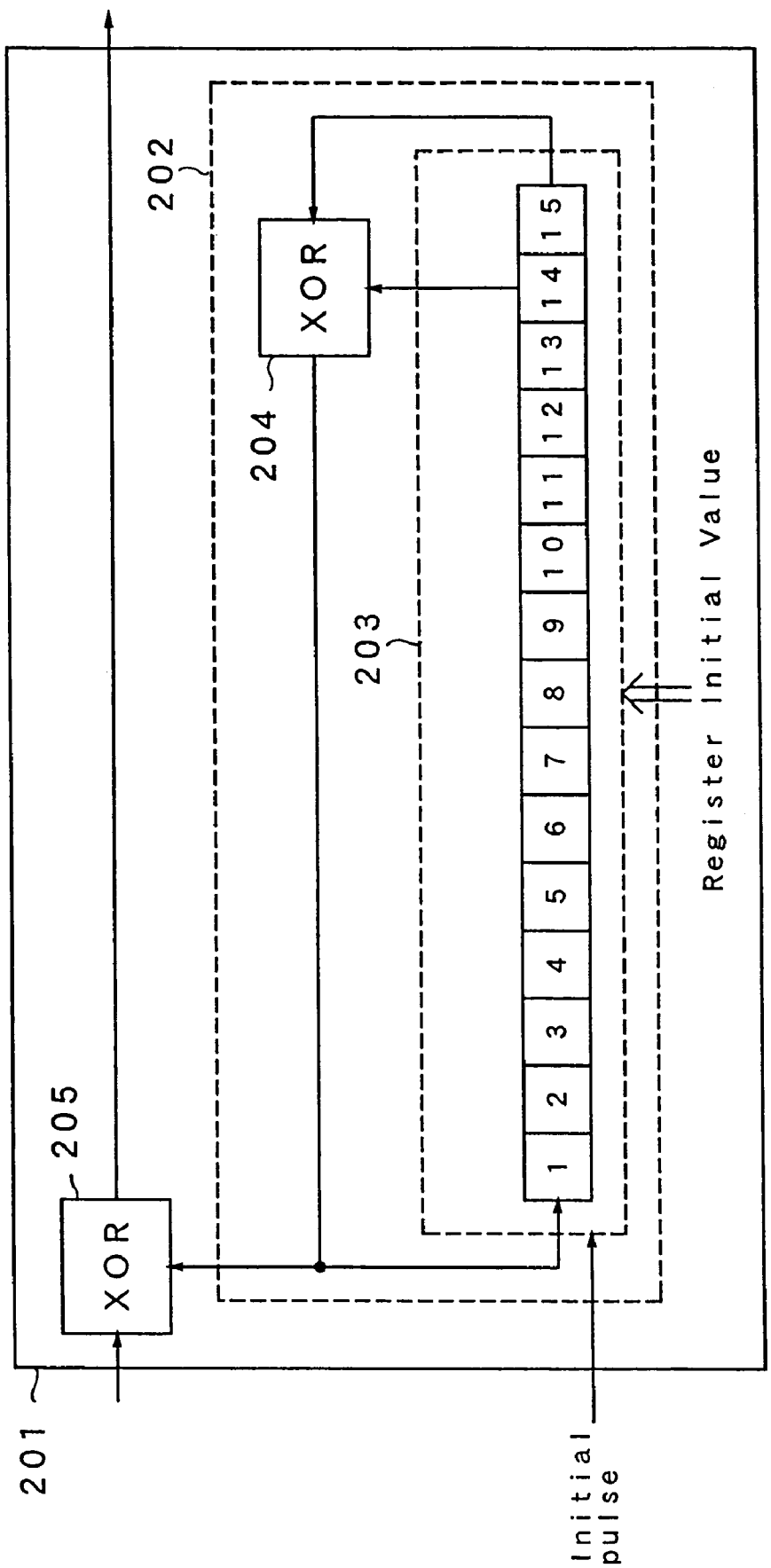
FIG. 1 is a block diagram illustrating a configuration of a conventional energy dispersal unit.
Figure 2:
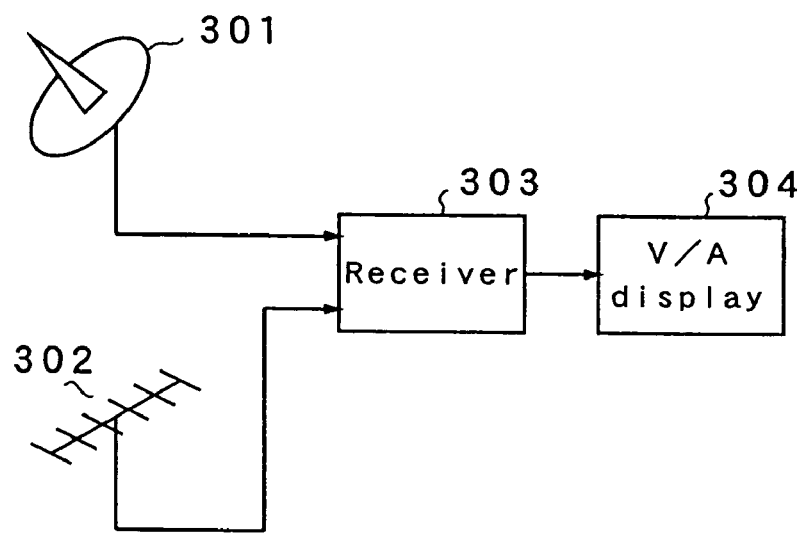
FIG. 2 is a block diagram illustrating a configuration of a conventional receiver.
Figure 3:
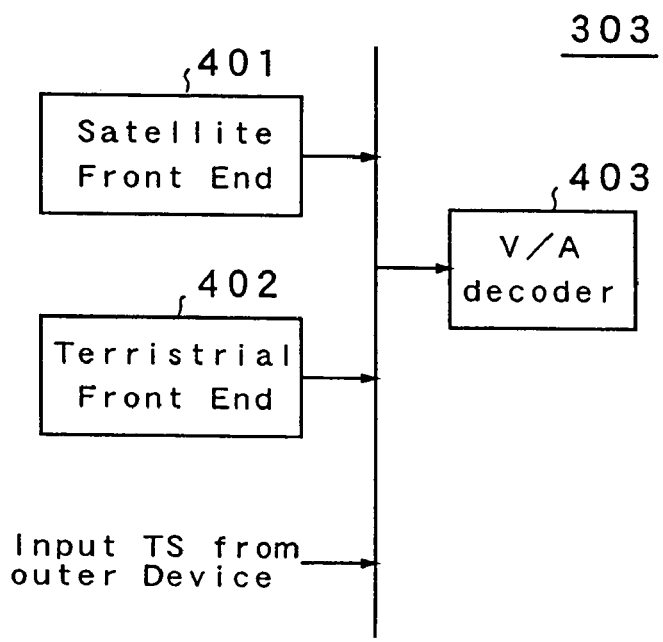
FIG. 3 is a block diagram illustrating an internal configuration of the conventional receiver.
Figure 4:
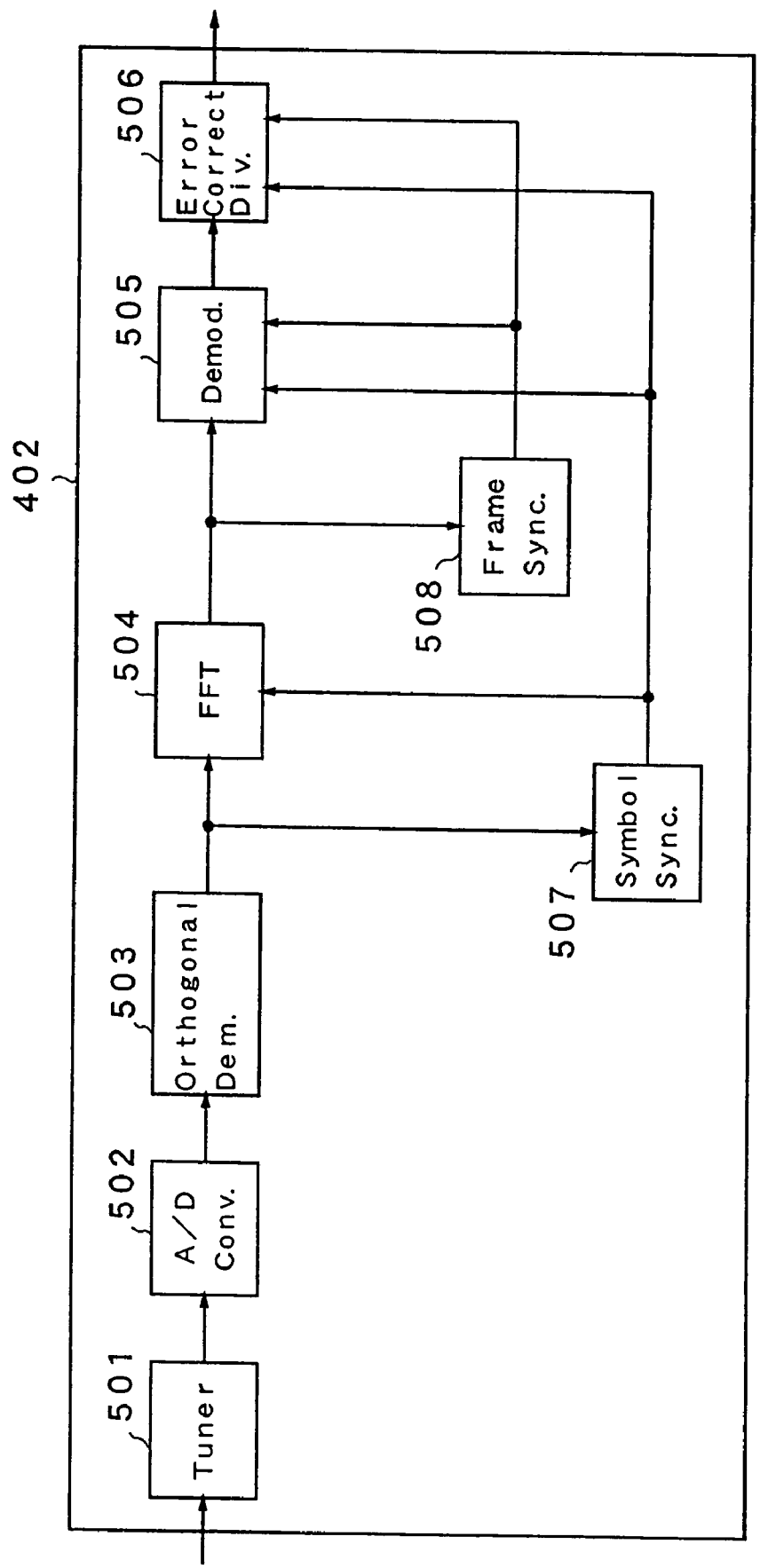
FIG. 4 is a block diagram illustrating a configuration of a conventional terrestrial front end.
Figure 5:
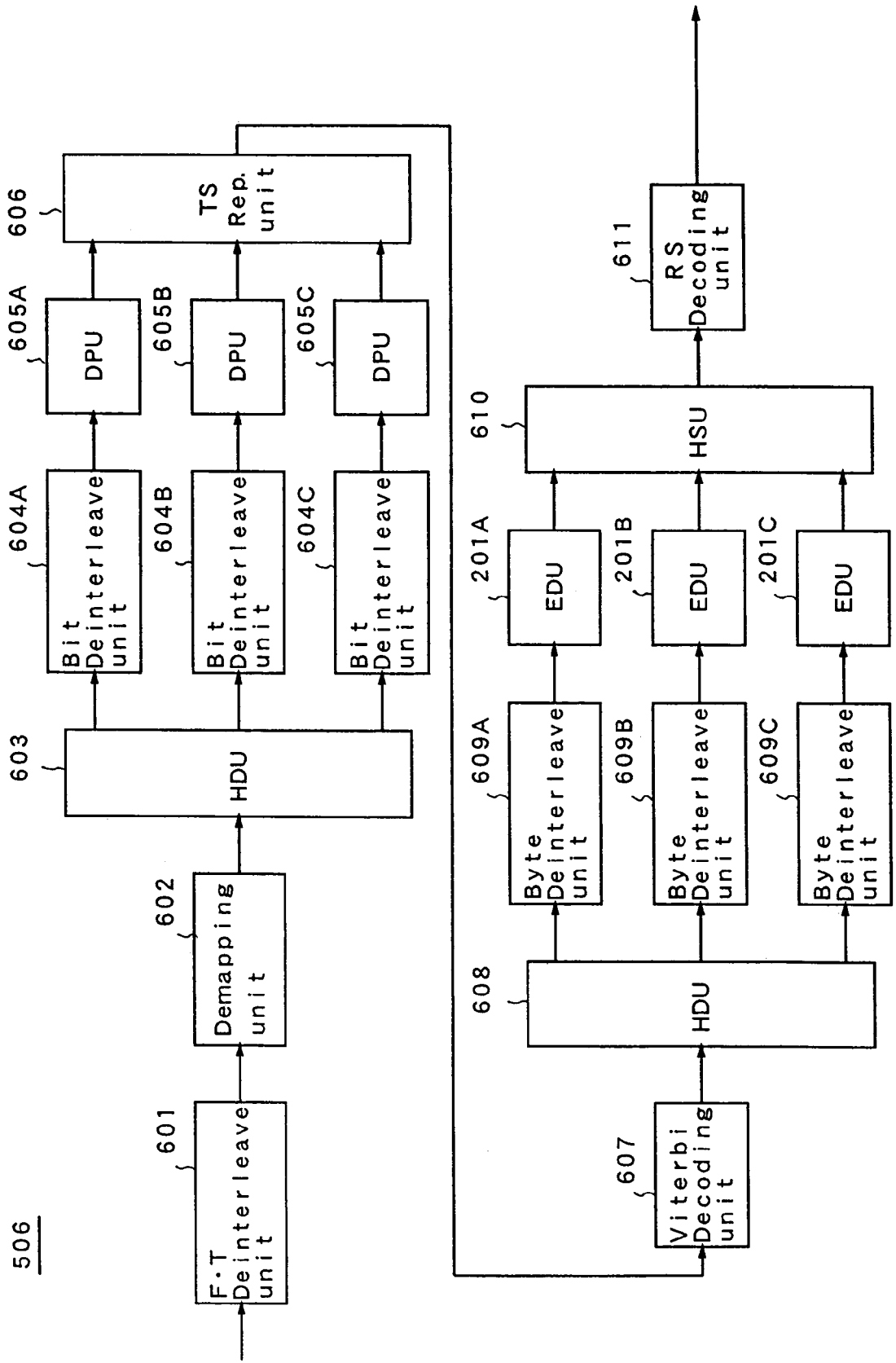
FIG. 5 is a block diagram illustrating a configuration of a conventional error correcting division.

A receiver according to an embodiment of the present invention will be described in detail referring to the drawings. Any component shown in the drawings identical to those recited in "BACKGROUND OF THE INVENTION" is simply provided with the same reference number, the description of which will not be given here.

Figure 6:
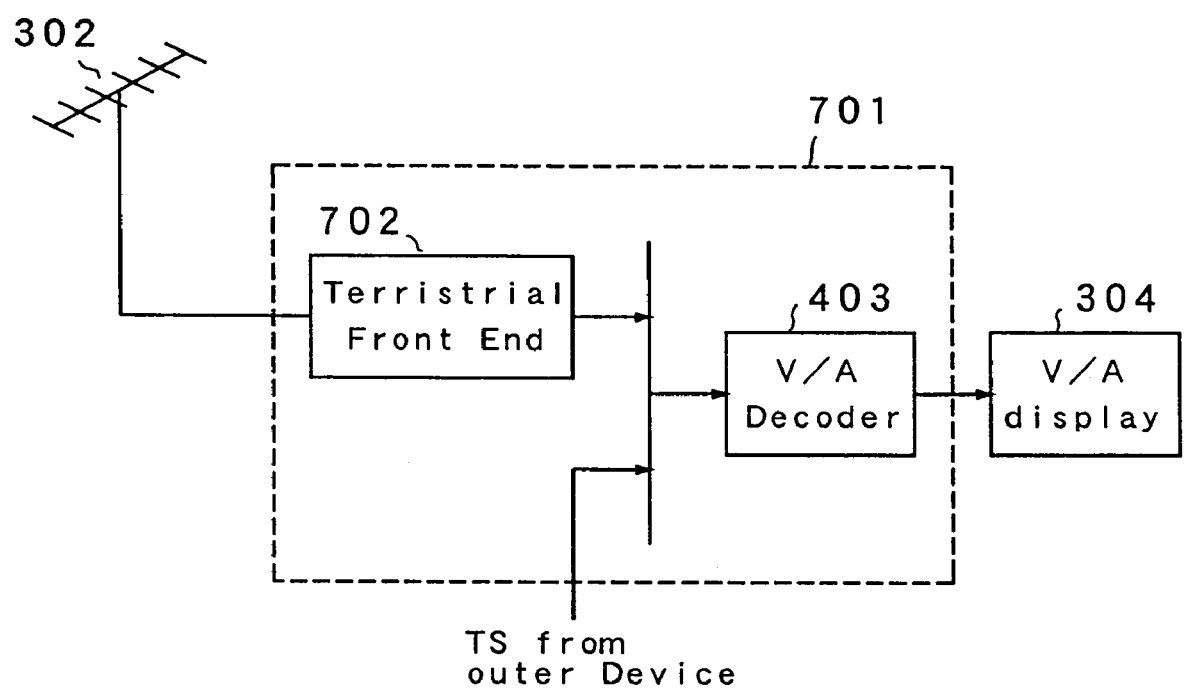
FIG. 6 is a block diagram illustrating a configuration of a receiver according to an embodiment of the present invention.

FIG. 6 is a block diagram illustrating a configuration of a receiver for the Japanese digital television broadcast according to an embodiment of the present invention. A receiver 701 comprises a terrestrial front end 702 and an video/audio decoder 403. The terrestrial front end 702 receives a terrestrial receive signal, performs channel selection, demodulation and error correction thereto and outputs TS. The video/audio decoder 403 receives one of TS outputted from the terrestrial front end 702 and TS inputted from an external apparatus and converts it into a video signal and an audio signal. The video signal or the audio signal or both of them obtained by the receiver 701 are outputted to a video/audio display device 304 to be displayed thereon. The receiver 701 can incorporate the video/audio display device 304 therein. The receiver 701 may be constituted as a shared receiver capable of receiving the satellite digital broadcast as well, as described in "BACKGROUND OF THE INVENTION".

Figure 7:
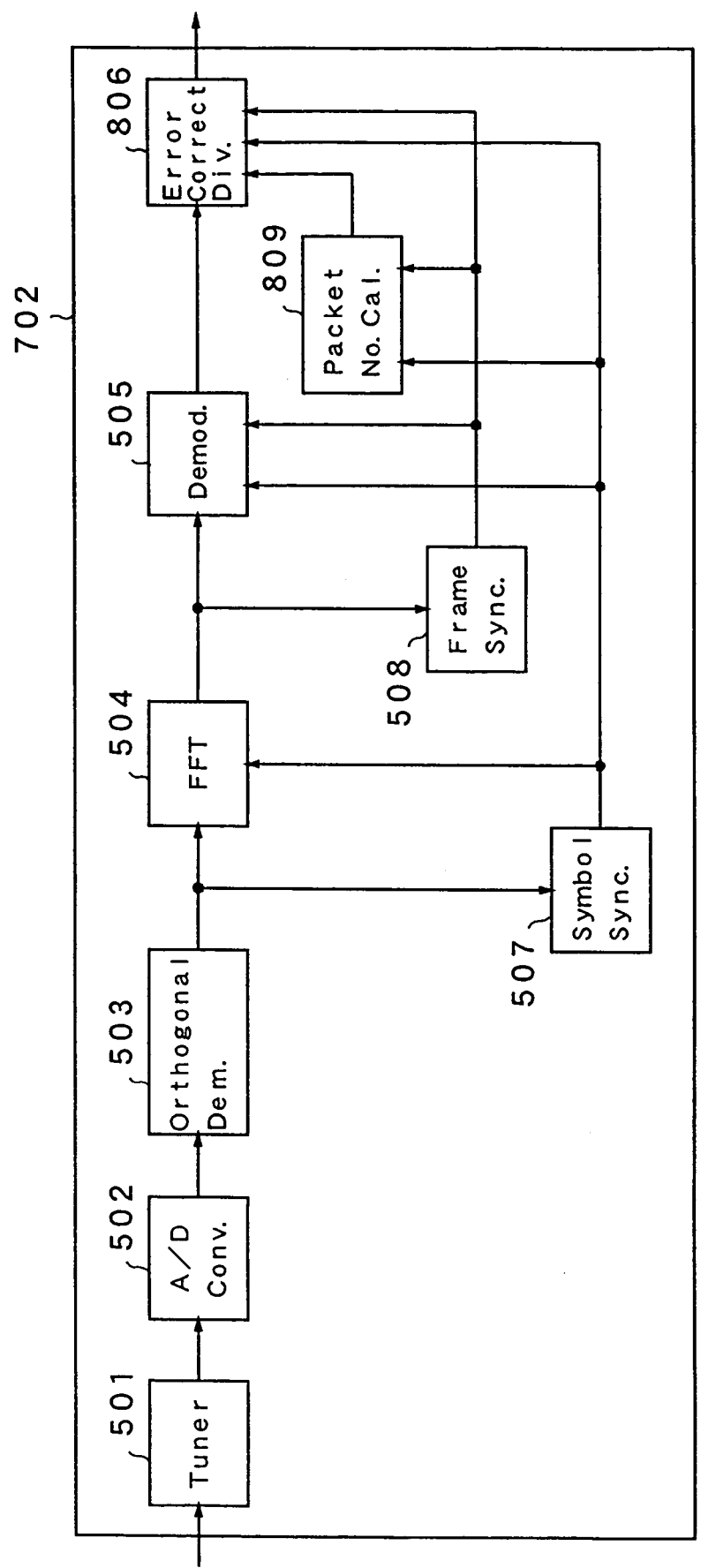
FIG. 7 is a block diagram illustrating a configuration of a terrestrial front end according to the embodiment of the present invention.

FIG. 7 is a block diagram illustrating a configuration of the terrestrial front end 702. The receive signal is channel-selected by a tuner 501 and is converted into a digital signal by an A/D converter 502. An orthogonal demodulating division 503 executes an orthogonal demodulation with respect to the inputted digital signal and converts the signal into a base band OFDM signal. An FFT division 504 executes fast Fourier transform to the signal from the orthogonal demodulating division 503 to thereby convert the signal, which is the signal of time domain, into a signal of frequency domain and then output it. A demodulating division 505 executes a synchronous demodulation or a differential demodulation to the signal from the FFT division 504 and outputs a demodulated signal. An error correcting division 806 executes an error-corrective decoding to the demodulated signal obtained in the demodulating division 505. A symbol synchronization division 507 detects transmission mode information and a symbol timing signal from the base band OFDM signal outputted from the orthogonal demodulating division 503. The symbol synchronization division 507 then supplies the symbol timing signal to the FFT division 504 and the demodulating division 505, and supplies the symbol timing signal and the transmission mode information to the error correcting division 806 and a packet number calculating division 809. A frame synchronization division 808 extracts control information included in the signal outputted from the FFT division 504 and detects a deviation generated from the frame leading position to the symbol leading position as a symbol number based on the control information. The frame synchronization division 808 then supplies the control information and the symbol number to the demodulating division 505, error correcting division 806 and calculating division 809. The calculating division 809, based on the symbol timing signal, symbol number, transmission mode information and control information, counts the number of effective packets from the frame leading position, per hierarchy if hierarchically transmitted, and outputs the counted number as a packet number.

Detailed description will be given below of a method for calculating the packet number based on the symbol timing signal, symbol number, transmission mode information and control information in the calculating division 809, for example, in the case of the ISDB-T.

One frame is constituted of 204 symbols. The one frame is also constituted of a plurality of packets. The number of the packets is different in modes 1, 2 and 3, and further depends on a guard interval ratio, which means that the one frame includes 12 different packet numbers. One packet is constituted of 204 bytes. In the one packet, a shift pulse for shifting a shift register of an energy dispersal unit is outputted by 8×204, that is, 1632 pulses. The respective packets constitute any of data in three hierarchies of A, B and C. A byte number $B_{num}$ as data in optional (hypothetically, X) hierarchies gained from executing respective processes such as demap, depuncture and Viterbi decoding when an optional number (hypothetically, SYM) of symbols have advanced since the frame leading position can be obtained in the following expression (1):

$$B_{num}=96 \cdot M \cdot S_X \cdot R_X \cdot 1/8 \cdot NSEG_X \cdot SYM \qquad (1),$$

$R_X$: convolution coding rate in X hierarchies, $NSEG_X$: segment number in X hierarchies, M: coefficient defined in accordance with transmission modes (shown in FIG. 8), and $S_X$: coefficient defined in accordance with carrier modulation methods in X hierarchies (shown in FIG. 9).

The expression (1) includes a dividing process which relies on the convolution coding rate.

When the followings expressions are provided:

$S_X=S'_X \times 2$, and $R_X=R'_X/24$, the expression (1) is represented by multiplication alone, as shown in the following expression (2):

$$B_{num}=M \cdot S'_X \cdot R'_X \cdot NSEG_X \cdot SYM \qquad (2).$$

When an arithmetic process in the expression (1) is thus simplified, a circuit size can be reduced. Herein, $S'_X$ and $R'_X$ take values presented in FIGS. 10 and 11, respectively, in accordance with the carrier modulation methods in the X hierarchies and the convolution encoding ratios in the X hierarchies.

From the expression (2), a packet number in the X hierarchies $P_{num}$ when the SYM number of symbols have advanced since the frame leading position is obtained in the following expression (3):

$$P_{num}=Int[B_{num}/204] \qquad (3).$$

A byte number $BUF_{num}$ stored in hierarchy buffers of the X hierarchies when the SYM number of symbols have advanced since the frame leading position is obtained in the same manner, deriving from the expression (2), in the following expression (4) by means of a residue operation:

$$BUF_{num}=mod[B_{num}/204] \qquad (4).$$

The mod in the expression (4) is the residue operation.

Figure 12:
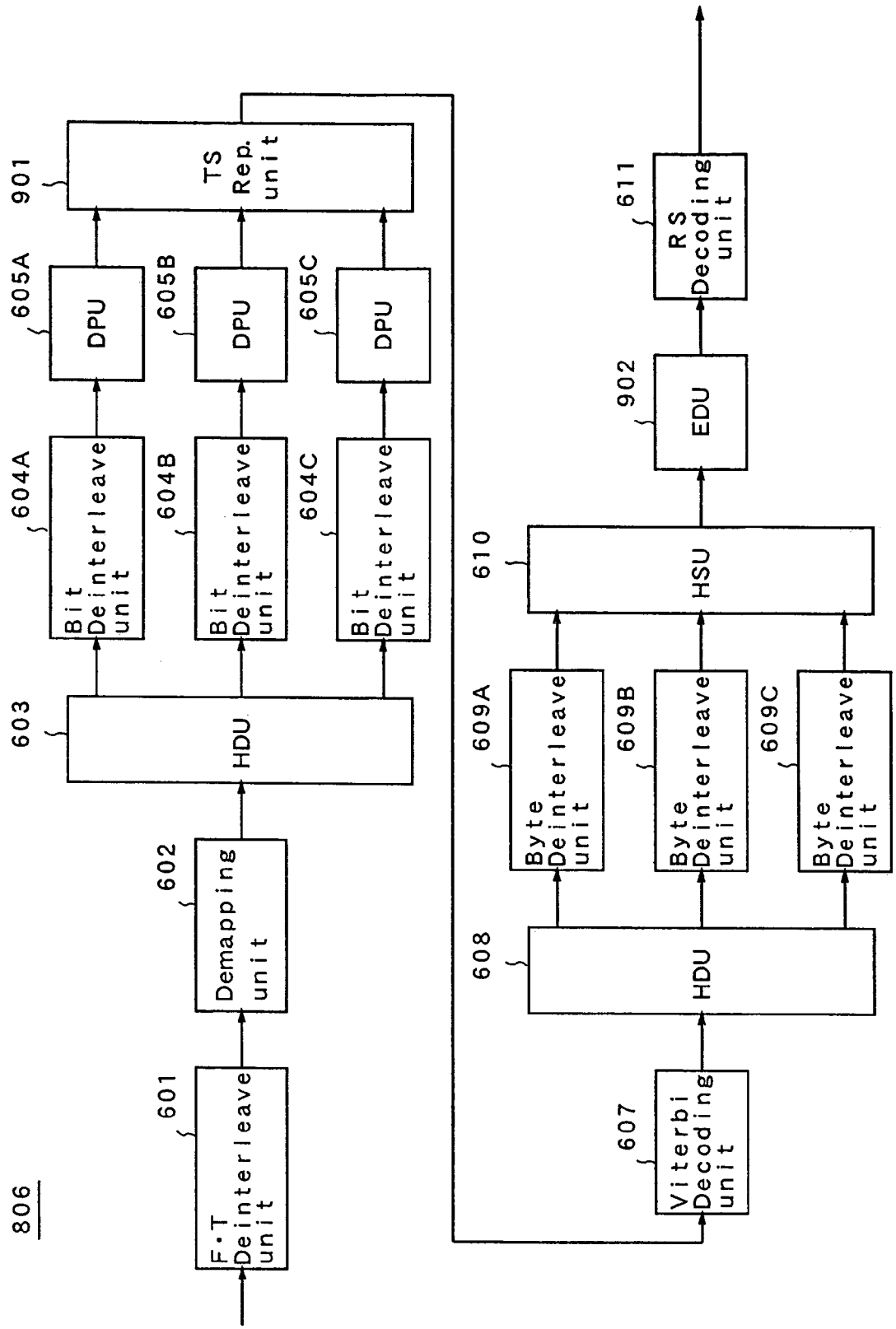
FIG. 12 is a block diagram illustrating a configuration of an error correcting division according to the embodiment of the present invention.

FIG. 12 is a block diagram illustrating a configuration of the error correcting division 806. In the figure, a frequency/time deinterleave unit 601 executes a frequency and time deinterleave process. A demapping unit 602 extracts bit information from carrier information. A hierarchy dividing unit (HDU) 603 divides data if the data is hierarchically transmitted. Bit deinterleave units 604A, 604B and 604C execute a bit deinterleave process per divided hierarchy. Depuncture units (DPUs) 605A, 605B and 605C execute a bit interpolation in response to the convolution encoding rate per divided hierarchy. A TS regeneration unit 901 organizes the data of the respective hierarchies into packet units of a predetermined bit length (herein, 1632 bits=204 bytes). A Viterbi decoding unit 607 executes the Viterbi decoding at the coding rate of ½. A hierarchy dividing unit (HDU) 608 executes the hierarchical division again. Byte deinterleave units 609A, 609B and 609C execute a byte deinterleave process per divided hierarchy. A hierarchy synthesizing unit (HSU) 610 synthesizes the data of the respective divided hierarchies. An energy dispersal unit 902 executes an energy dispersal for the synthesized data by the hierarchy synthesizing unit 610. An RS decoding unit 611 decodes an abbreviated Reed Solomon code (204, 188).

Figure 13:
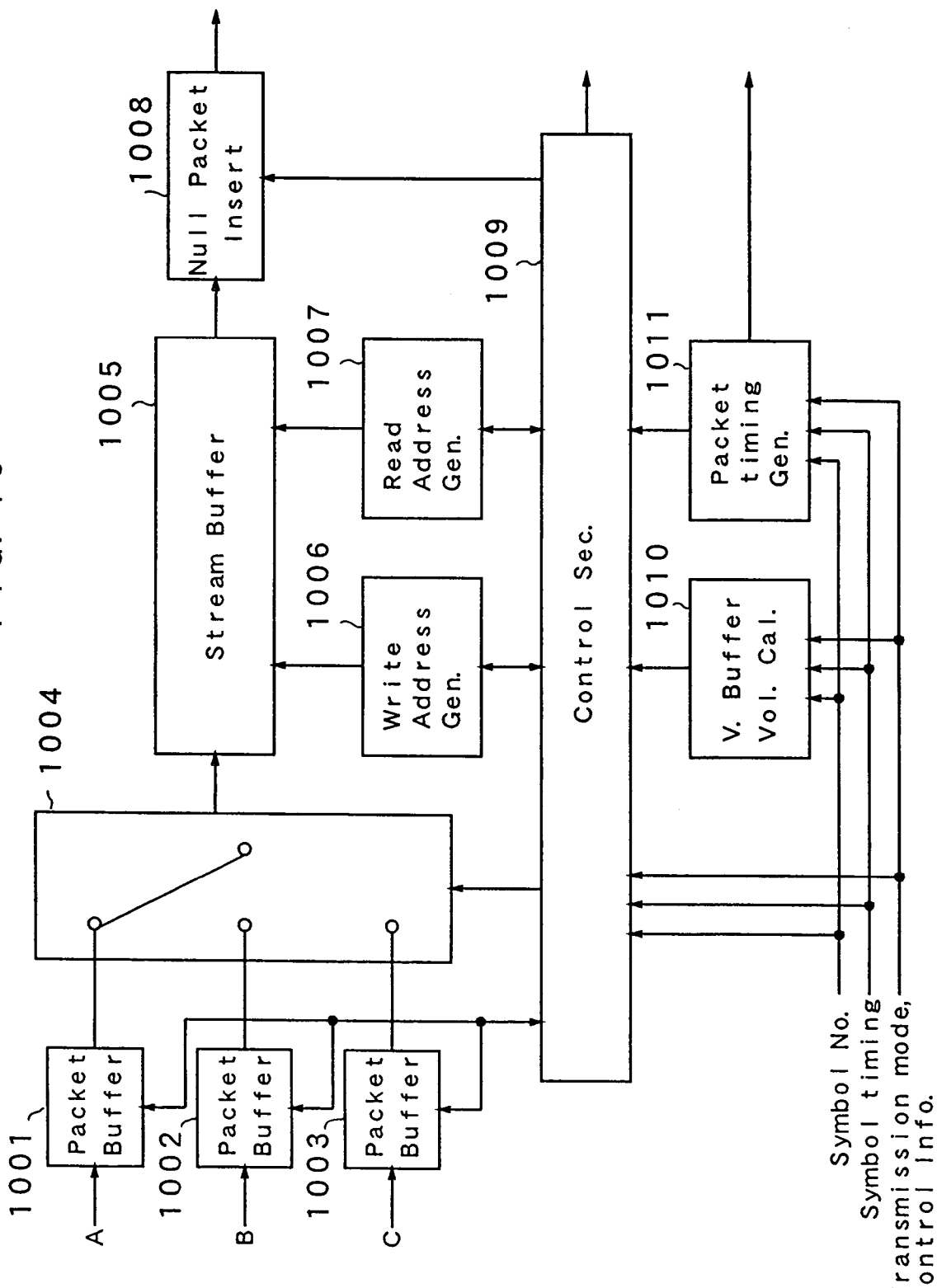
FIG. 13 is a block diagram illustrating a configuration of a TS regeneration unit.

FIG. 13 is a block diagram illustrating a configuration of the TS regeneration unit 901. In the figure, a virtual buffer volume calculating section 1010 calculates respective buffer volumes which are supposed to be stored in a plurality of packet buffers 1001, 1002 and 1003 based on the symbol timing signal, symbol number, transmission mode information and control information at the symbol leading positions thereof. A packet timing generating section 1011 outputs a packet timing signal. A control section 1009 loads the virtual buffer volumes in data storage volume counters of the plurality packet buffers while watching the storage volumes. The control section 1009 further introduces the stored data sequentially from the packet buffers supplied with the data corresponding to one packet into a stream buffer 1005 via a selection section 1004. The control section 1009 also watches a state of the data storage in the stream buffer 1005 per packet timing signal, and executes its control so as to read the stored data when any data is stored in the stream buffer 1005. A write address generator 1006 and read address generator 1007 generate write address and read address respectively by a control of the control section 1009. Moreover, the control section 1009, when there is any packet data to be outputted from the stream buffer 1005, presents a hierarchy where the packet data belongs, and outputs hierarchy information denoting a null packet when there is no packet data to be outputted. Thus, the packet data can be instantly read irrespective of the timing of the frame cycle. A null packet insert section 1008 insert a null packet to the stored data from the stream buffer 1005.

Figure 14:
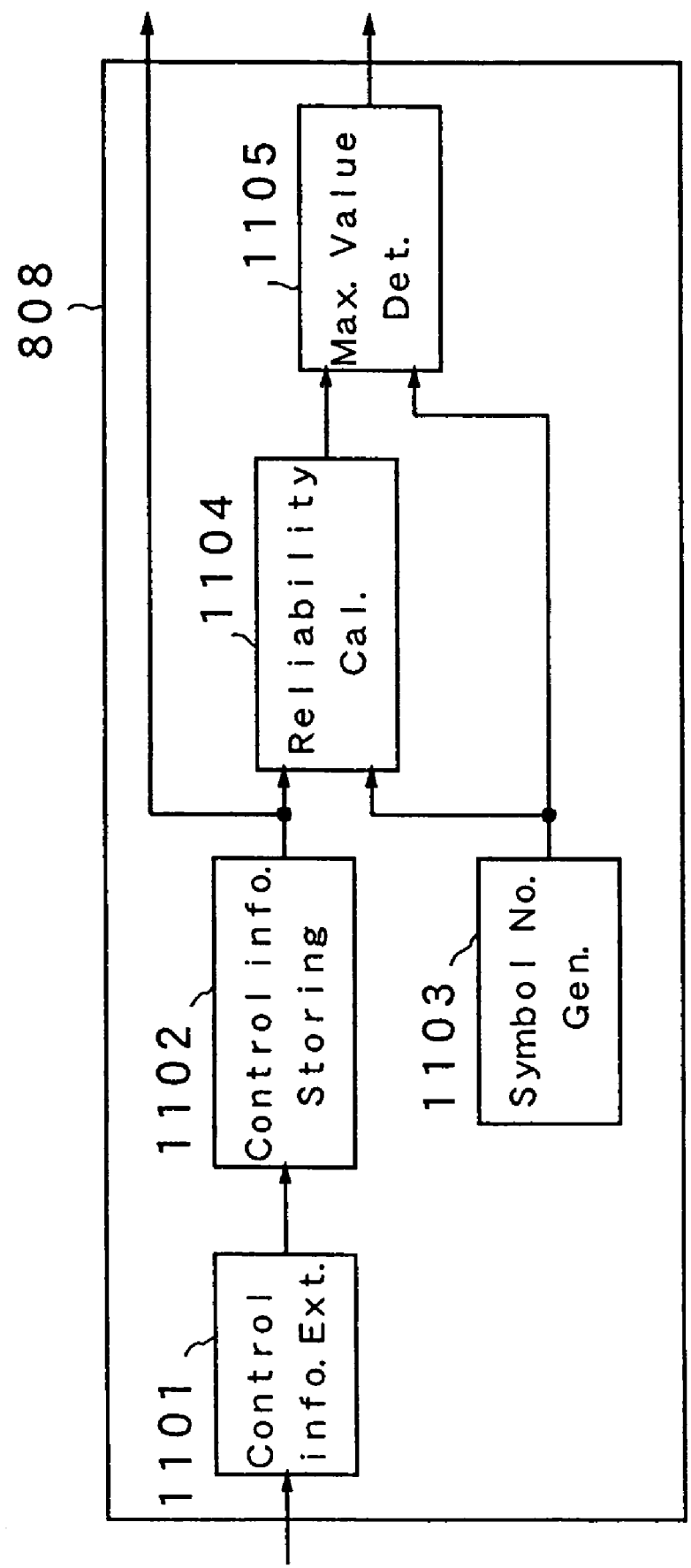
FIG. 14 is a block diagram illustrating a configuration of a frame synchronization division.

FIG. 14 is a block diagram illustrating a configuration of the frame synchronization division 808. A control information extracting unit 1101 extracts control information. A control information storing unit 1102 stores the control information for one frame. A symbol number generating unit 1103 virtually outputs a symbol number. A reliability calculating unit 1104 refers to the control information stored in the control information storing unit 1102 and calculates a reliability corresponding to the symbol number outputted from the symbol number generating unit 1103. A maximum value detecting unit 1105 compares a plurality of reliabilities calculated by the reliability calculating unit 1104, and selects and outputs a symbol number at the time point when a maximum level of reliability is calculated. As the control information, a TMCC signal in the case of the ISDB-T and ISDB-$T_{SB}$, for example, is envisaged in the present example. With the above configurations, the TMCC signal, other than a synchronous signal, is used for the detection so that it becomes unnecessary to wait for alternation of the synchronous signal disposed in the TMCC signal to be detected. The frame synchronization can be promptly detected while reducing a possibility of incorrect detection.

The virtual buffer volume calculating section 1010 of the TS regeneration unit 901 calculates the respective buffer volumes which are supposed to be stored in the plurality of packet buffers 1001, 1002 and 1003 based on the symbol timing signal, symbol number, transmission mode information and control information at the symbol leading positions thereof. The expression (4) is provided for calculating the buffer volumes. Therefore, as an alternative arrangement, the packet number calculating division 809 may be disposed in the TS regeneration unit 901 of the error correcting division 806 so that the part for calculating the expression (2) is common with the virtual buffer volume calculating section 1010. An entire circuit configuration can be thereby simplified. The packet number calculating division 809, after calculating the packet number per hierarchy from the symbol number, counts up the packet number to be outputted one by one based on the packet timing signal outputted from the packet timing generating section 1011 and the hierarchy information outputted from the control section 1009. The packet number calculating division 809, further, resets the packet numbers of the entire hierarchies to zero whenever the symbol number 0 denoting the frame leading position is inputted.

Figure 15:
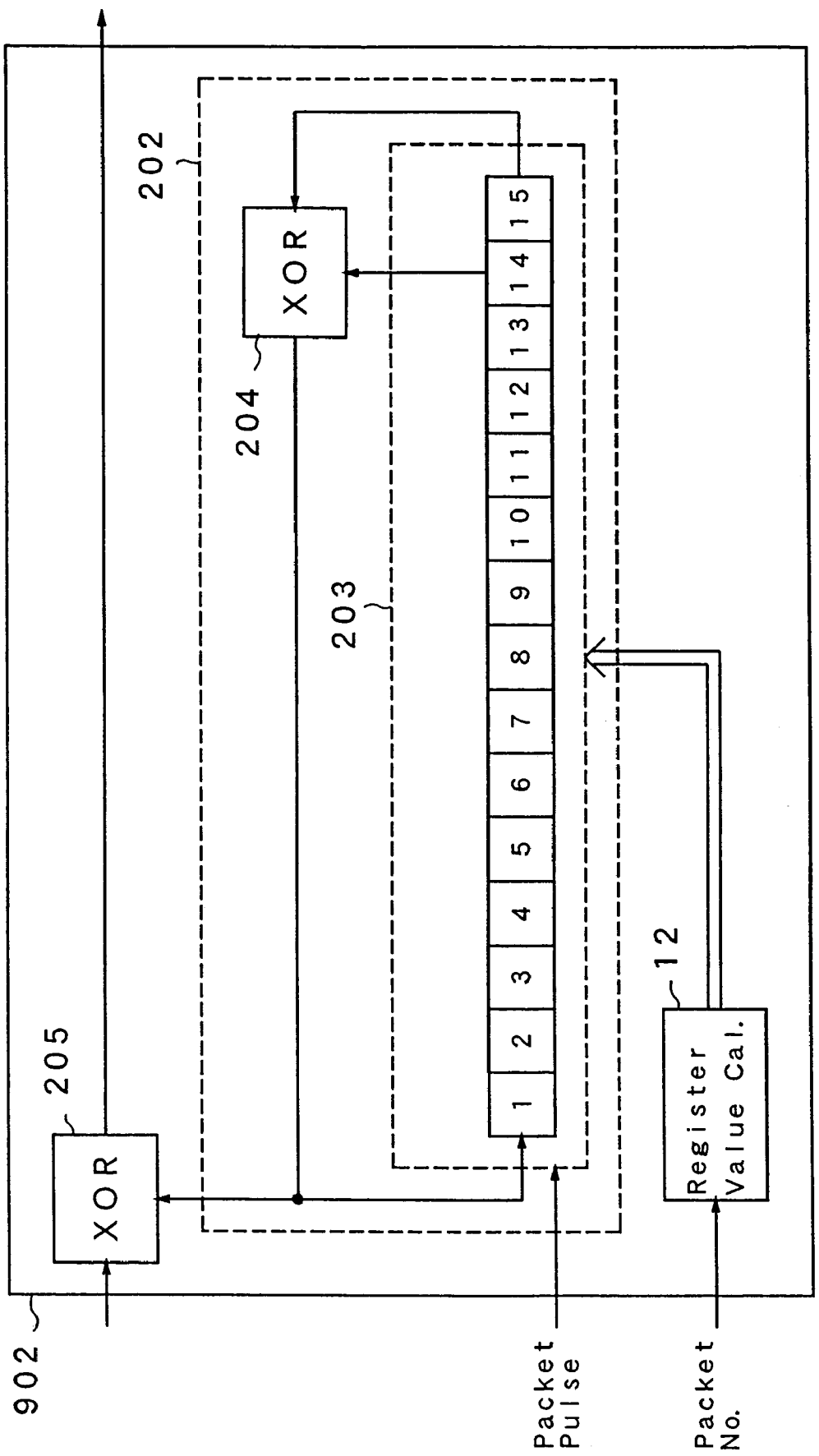
FIG. 15 is a block diagram illustrating a configuration of an energy dispersal unit according to the embodiment of the present invention.

FIG. 15 is a block diagram illustrating a configuration of the energy dispersal unit 902. A PRBS generating section 202 generates a pseudo random binary sequence (PRBS). The PRBS generating section 202 is configured by a shift register 203 of 15 bits and an exclusive-OR (XOR) operator 204. An XOR operating circuit 205 executes XOR with respect to the data signal inputted to the energy dispersal unit and the PRBS generated by the PRBS generating section 202. A register value calculator 12 constitutes a state setting section designed to calculate a register value of the shift register 203 based on the packet number provided by the packet number calculating division 809 and set the value in the shift register 203. The energy dispersal unit 902 executes the XOR operation with respect to the data signal, excluding the synchronization byte, and the PRBS. The shift register 203 is operated including the period of the synchronization byte and is initialized per frame to the register value outputted from the register value calculator 12.

Figure 16:
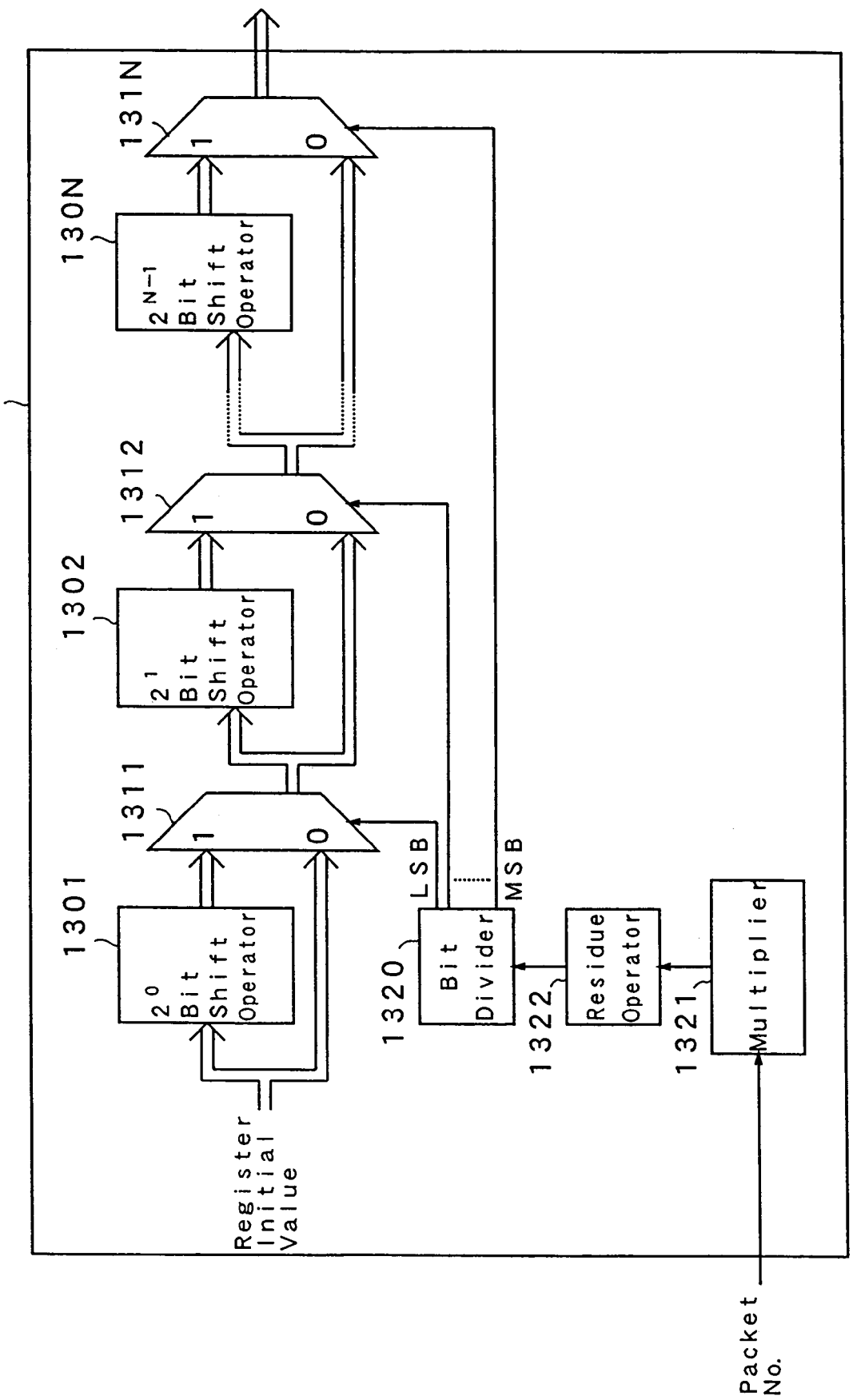
FIG. 16 is a block diagram illustrating a first configuration of a register value calculator according to the embodiment of the present invention.

FIG. 16 is a block diagram illustrating a register value calculator 12A, which is a first example of the register value calculator 12. In the register value calculator 12A, a multiplier 1321 multiplies the inputted packet number by a bit number PS (1632, because 1 packet=1632 herein) of one packet. A residue operator 1322 executes a residue operation by means of a predetermined number ($2^{15}-1=32767$ herein) with respect to the multiplying result. A bit divider 1320 divides a result obtained from the residue operation based on bits and sequentially supplies the divided result from LSB to selectors 1311 to 131N. Bit shift operators 1301 to shifts a register initial value, that is, "100101010000000" by $2^0$. Bit shift operator 1302 to 130N shift the input values by $2^1$ to $2^{N-1}$, respectively. The first selector 1311 to the N-th selector 131N select one of the register value subjected to a bit shift operation based on the bit data supplied from the bit divider 1320 and the register value not subjected thereto. The residue operation is performed by the residue operator 1322 because the PRBS generated by the PRBS generating section 202 has a cyclic pattern of $2^{15}-1$, which simplifies the configuration. The result obtained from the residue operation is $2^{15}-2$ at maximum, which can be represented in 15 bits (N=15), meaning that the required numbers of the bit shift operators and the selectors are 15, respectively. The multiplier 1321 and the residue operator 1322 constitute a cycle number calculating portion for calculating a bit shift number from an initial state based on an operation packet number from the initial state of the PRBS generating section. The bit shift operators 1301 to 130N and the selectors 1311 to 131N constitute an intermediate value generating portion supplied with initialization data for initializing the shift register and the divided bits from the bit divider 1320 and serving to generate an intermediate value to be loaded in the PRBS generating section.

The first selector 1311, when the register initial value is given thereto, selects one of the register value obtained from the $2^0$ bit shift operator 1301 and the register initial value based on if the LSB of the bit-divided data of the bit dividing portion 1320 is "1" or "0". The j-th (j=2 to 15) selector, when an output of the (j−1)-th selector is given thereto, selects one of the register value obtained from the $2^{j-1}$ bit shift operator and the output of the (j−1)-th selector based on if the (j−1)-th data from the LSB of the bit-divided data of the bit divider 1320 is "1" or "0".

Next, detailed description will be given of the $2^i$ bit shift operators (i=0 to 14) 1301 to 130N. A 1-bit shift operation for a register initial value, "100101010000000", can be realized as follows. The four 15-bit data obtained by dividing the register initial value "100101010000000" based on bits are as follows: "100000000000000", "000100000000000", "000001000000000" and "000000010000000". These 15-bit data are respectively subjected to the 1-bit shift operation. The following four data resulting from the 1-bit shift operation, "010000000000000", "000010000000000", "000000100000000" and "000000001000000", are subjected to the summation of the exclusive-OR operation based on bits.

In the same manner, an N-bit shift register operation with respect to an optional register value is realized by performing the summation of the exclusive-OR based on bits to the respective values resulting from executing the N-bit shift operation to the respective values obtained by dividing the original register value based on bits.

In order to accelerate the shift operation, the shift operation by an optional shift amount is divided into a combination of $2^n$ shift operations. When 585 shift operation is performed, for example, because of $585=2^0+2^3+2^6+2^9$, a $2^0$ shift operation, a $2^3$ shift operation, a $2^6$ shift operation and a $2^9$ shift operation are each performed once. The higher-speed shift operation can be thereby realized.

As an example of a $2^n$ shift operation circuit, $2^6=64$ bit shift operation will be described referring to FIGS. 17 and 18.

It is assumed that a register value to be shifted is "$b_0b_1b_2b_3b_4b_5b_6b_7b_8b_9b_{10}b_{11}b_{12}b_{13}b_{14}$", and a register value obtained as a result of the 64-bit shift operation is "$B_0B_1B_2B_3B_4B_5B_6B_7B_8B_9B_{10}B_{11}B_{12}B_{13}B_{14}$". As described earlier, results obtained from performing the 64-bit shift operation respectively to the values obtained by dividing "$b_0b_1b_2b_3b_4b_5b_6b_7b_8b_9b_{10}b_{11}b_{12}b_{13}b_{14}$" based on bits, "$b_000000000000000$", "$0b_10000000000000$", "$00b_20000000000000$", ... "$00000000000000b_{14}$", are shown in FIG. 17. Parts subjected to the summation of the exclusive-OR based on bits with respect to the obtained results, "$0000b_0000b_0000000$", "$00000b_1000b_100000$", "$000000b_2000b_20000$", ... "$000b_{14}000b_{14}0000000$", are generated as follows in the manner illustrated in FIG. 18 as an operation logic:

$$B_0 = b_6 + b_7 + b_{10} + b_{11},$$
$$B_1 = b_7 + b_8 + b_{11} + b_{12},$$
$$B_2 = b_8 + b_9 + b_{12} + b_{13},$$
$$\vdots$$
$$B_{14} = b_6 + b_{10}.$$

For example, the bit shift operator 1307 for executing the $2^6$ bit shifts can be realized when configured as illustrated in FIG. 19. According to the described method, the bit shift operators 1301 to 130N for executing the shifts from $2^0$ to $2^{14}$ can be realized.

The register value calculator 12 may have a 2N shift operation table and a matrix operation (XOR) logic.

FIG. 20 is a block diagram illustrating a register value calculator 12B differently configured. The application of the approaches described so far can also lead to the realization by means of the block configuration illustrated in FIG. 20. As a unit of the shift, one packet=1632 is provided, and all of operation logics for executing the shifts from $2^0$ packet (1632 bits) shifts to $2^{11}$ packet (3342336 bits) shifts are prepared in a cascade so as to decide if the respective $2^N$ packet shifts are operated or passed in accordance with the packet number. More specifically, in FIG. 20, a bit divider 120 divides the inputted packet number based on bits and sequentially supplies selectors 111 to 11N with the divided packet number from the LSB. Packet shift operators 101 to 10N sequentially shift the register initial value, "100101010000000", for $2^0$ to $2^{N-1}$ packets. The first to N-th selectors 111 to 11N select one of the register value subjected to the packet shift operation and the register value not subjected thereto based on the bit data supplied from the bit divider 120.

The $2^0$ packet shift operator 101 performs the Ps shifts to the inputted register value providing that a shift amount corresponding to Ps as a shift number for one packet is Ps. The packet shift operator 102 executes the packet shift number Ps×$2^1$ to the register value selected by the selector 110. Thereafter, the respective $2^i$ packet shift operators respectively execute the operation of Ps×$2^i$ (i=0 to 11). The $2^0$ packet shift operators 101 to 10N and the selectors 111 to 11N constitute an intermediate value generating portion for generating an intermediate value to be provided for the shift register. The first selector 111, when the register initial value is given thereto, selects one of the register value obtained from the $2^0$ packet shift operator 101 and the register initial value depending on if the LSB of the bit-divided data of the bit dividing portion 120 is "1" or "0". The j-th (j=2 to 12) selector, when the output of the (j−1)-th selector is provided for, selects one of the register value obtained from the $2^{j-1}$ packet shift operator and output of the (j−1)-th selector depending on if the (j−1)-th data from the LSB of the bit-divided data of the bit dividing portion 120 is "1" or "0".

For example, in the case of the ISDB-T, the number of effective packets in one frame is 3276 at maximum. Therefore, the packet number can be represented in 12 bits ($2^{12}=4096>3276$). Then, N=12 is obtained, the required numbers of the packet shift operators and the selectors are 12. Further, in the present case, the multiplication of the packet number×1632 and the residue operation of the mod($2^{15}-1$) become unnecessary.

Next, detailed description will be given of the $2^i$ packet shift operators (i=0 to 11) 101 to 10N. FIG. 21 illustrates how a provided packet number and bit number correspond to each other and a result of the bit number subjected to the residue operation by $2^{15}-1$ (=32767).

Next, as an example of the $2^i$ packet shift operator, an operation logic of the $2^{10}$ packet shift operator will be described referring to FIGS. 22 and 23.

Figure 24:
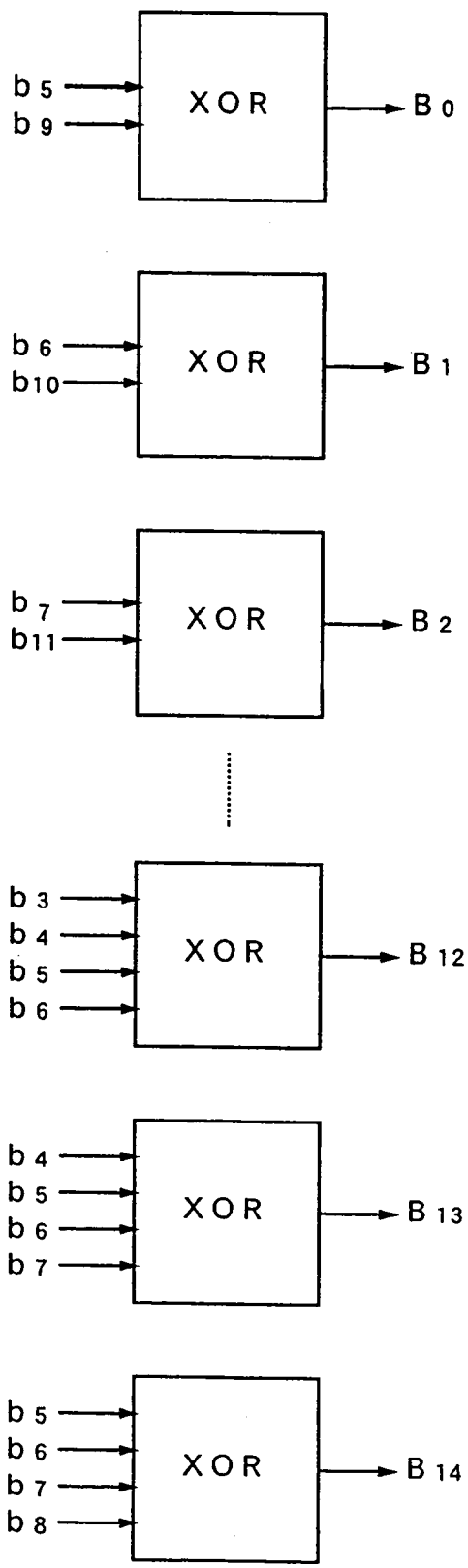
FIG. 24 is a block diagram illustrating a configuration of the $2^{10}$ packet shift operator.

Referring to FIG. 21, the $2^{10}$ packet shift operating, which is equivalent to 51-bit shift operation, can be configured in the same manner as in the method of generating the $2^i$-bit shift operation logic. More specifically, it is assumed that the register value to be shifted is "$b_0b_1b_2b_3b_4b_5b_6b_7b_8b_9b_{10}b_{11}b_{12}b_{13}b_{14}$", and the register value obtained as a result of the 51-bit shift operation is "$B_0B_1B_2B_3B_4B_5B_6B_7B_8B_9B_{10}B_{11}B_{12}B_{13}B_{14}$". Results of performing the 51-bit shift operation respectively to the values obtained by dividing "$b_0b_1b_2b_3b_4b_5b_6b_7b_8b_9b_{10}b_{11}b_{12}b_{13}b_{14}$" based on bits, "$b_000000000000000$", "$0b_10000000000000$", "$00b_20000000000000$", ... "$00000000000000b_{14}$" are shown in FIG. 22. "$B_0B_1B_2B_3B_4B_5B_6B_7B_8B_9B_{10}B_{11}B_{12}B_{13}B_{14}$" can be obtained by performing the summation of the exclusive-OR based on bits to the obtained results, which are "$000000b_0b_0b_0b_000000$", "$0000000b_1b_1b_1b_10000$", "$00000000b_2b_2b_2b_2000$", ... "$00000b_{14}b_{14}b_{14}b_{14}000000$". Parts subjected to the summation of the exclusive-OR based on bits are generated as follows as an operation logic, as illustrated in FIG. 24:

$$B_0 = b_5 + b_9,$$
$$B_1 = b_6 + b_{10},$$
$$B_2 = b_7 + b_{11},$$
$$\vdots$$
$$B_{14} = b_5 + b_6 + b_7 + b_8.$$

The $2^0$ to $2^{11}$ packet shift operators can be configured in the same manner.

According to the conventional energy dispersal method, the initialization at the frame leading position is an indispensable factor, which generated a standby time (approximately 257 ms at maximum) from the start of the signal reception until the output of a correct receive signal. On the contrary, according to the present invention, the energy dispersal can be commenced without any standby time between the signal reception start and the frame leading position. Therefore, a time length from power-on or channel-switchover until services are actually presented, that is, displaying a video on a screen and outputting an audio can be reduced.

Further, according to the conventional energy dispersal method, the values of the shift register must be retained per hierarchy in the case of the hierarchical transmission, which demanded a plurality of energy dispersal units, as described in "BACKGROUND OF THE INVENTION". According to the present invention, the register value can be calculated per packet timing based on the packet number different per hierarchy, which requires only one energy dispersal unit. For reference, a plurality of energy dispersal units in response to the number of the hierarchies may be included as in the conventional configuration.

The present embodiment was described referring to the receiver for the terrestrial digital television broadcast (ISDB-T) in Japan. However, the energy dispersal method by means of the energy dispersal unit described so far can be applied to any type of receiver (or transmitter) as long as the packet number or the number of bits (cycle) having advanced since the initialization is inputted.

The energy dispersal circuit and the receiver according to the present invention are capable of exerting such an effect as reducing the time length from the power-on or channel-switchover until services, such as displaying the video on the screen and outputting the audio, are actually presented. The energy dispersal circuit and the receiver according to the present invention, therefore, are useful for a DIRD (Digital Integrated Receiver Decoder) (including household-use television, set top box and the like), a recording apparatus, a mobile reception terminal, a vehicle-mounted reception terminal and the like, which receive the digital television broadcast or digital audio broadcast.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application No. 2003-422716 filed on Dec. 19, 2003 is hereby incorporated by reference.

What is claimed is:

1. An energy dispersal circuit which is used for a receiver, wherein said receiver receives a data signal which is divided into packets of a predetermined number of bits, constituted as a frame of a predetermined number of packets, and said receiver executes energy dispersal with respect to the data signal, the energy dispersal circuit comprising:

a state setting section;

a pseudo random binary signal (PRBS) generating section which includes a shift register for executing shifts in accordance with transmission bits and an exclusive-OR operator for inputting a partial output of said shift register and executing a first exclusive-OR operation thereto, wherein said exclusive-OR operator further outputs and feeds back a result to said shift register to be inputted therein, said shift register is initialized per frame by a register initial value, and which generates a pseudo random binary signal; and an exclusive-OR circuit which executes a second exclusive-OR operation with respect to the pseudo random binary signal obtained from said PRBS generating section and the data signal;

wherein said state setting section generates data of said shift register shifted in one frame from an initial state of said PRBS generating section in accordance with a transmission bit number from the initial state and provides the data to said shift register of said PRBS generating section; and said state setting section calculates a state of said PRBS generating section based on an operated packet number from the initial state of said PRBS generating section, and provides a result to said shift register of said PRBS generating section.

2. An energy dispersal circuit according to claim 1, wherein said state setting section comprises:

a cycle number calculating portion which calculates a bit shift number from the initial state based on an operated packet number from the initial state of said PRBS generating section;

a bit divider which divides data of the bit shift number obtained by said cycle number calculating portion based on bits from LSB to MSB; and an intermediate value generating portion which is supplied with initialization data for initializing said shift register per frame and the divided bits of said bit divider and generates an intermediate value of said shift register to be loaded in said PRBS generating section.

3. An energy dispersal circuit according to claim 2, wherein said cycle number calculating portion comprises:

a multiplier which calculates the bit shift number by multiplying the operated packet number from the initial state of said PRBS generating section by a bit number for one packet; and a residue operator which calculates a residue bit shift number by dividing the obtained bit number by a bit shift number corresponding to a cycle of said PRBS generating section.

4. An energy dispersal circuit according to claim 2, wherein said intermediate value generating portion comprises:

$2^0$ bit shift operator which generate a register value by executing shift operation of 1 ($=2^0$) bit to said register initial value;

$2^i$ ($i=1$ to 14) bit shift operators which generate register values by executing shift operation of $2^i$ bits to inputted values;

a first selector which selects one of a register value obtained from said $2^0$ bit shift operator and said register initial value based on the LSB of the bit-divided data of said bit divider when said register initial value is given, and outputs said selected value to said $2^1$ bit sift operator;

j-th (j=2 to 14) selectors which respectively select one of a register value obtained from said $2^{j-1}$ bit shift operator and an output of said (j−1)-th selector based on a (j−1)-th data from the LSB of the bit-divided data of said bit divider when the output of said (j−1)-th selector is given, and output said selected values to $2^j$ bit shift operator and (j+1)-th selector; and, a 15th selector which selects one of a register value obtained from said $2^{14}$ bit shift operator and an output of said 14-th selector based on a 14-th data from the LSB of the bit-divided data of said bit divider when the output of said 14-th selector is given, and outputs said selected values to said PRBS generating section, wherein an output of said fifteenth selector is outputted as a register value of said PRBS generating portion.

5. An energy dispersal circuit according to claim 1, wherein said state setting section comprises:
   a bit divider which divides the operated packet number from the initial state of said PRBS generating section based on bits from LSB to MSB; and
   an intermediate value generating portion which is supplied with initialization data for initializing said shift register per unit frame and the divided bits of said bit divider and generates an intermediate value provided for the shift register of said PRBS generating section.

6. An energy dispersal circuit according to claim 5, wherein said intermediate value generating portion comprises:
   $2^0$ packet shift operator which generates a register value by executing shift operation of Ps bits to said register initial value, when a shift amount for one packet is Ps;
   $2^i$ (i=1 to 11) packet shift operators which generate register values by executing shift operation of Ps×i bits to inputted values;
   a first selector which selects one of a register value obtained from said $2^0$ packet shift operator and said register initial value based on the LSB of the bit-divided data of said bit divider when said register initial value is given, and outputs said selected value to said $2^1$ bit sift operator;
   j-th (j=2 to 11) selectors which respectively select one of a register value obtained from said $2^{j-}$ packet shift operator and an output of a (j−1)-th selector based on (j−1)-th data from the LSB of the bit-divided data of said bit divider when the output of the (j−1)-th selector is given, and output said selected values to said $2^j$ packet shift operator and said (j+1)-th selector; and,
   a 12-th selector which selects one of a register value obtained from said $2^{11}$ packet shift operator and an output of a 11-th selector based on 11-th data from the LSB of the bit-divided data of said bit divider when the output of the 11-th selector is given, and outputs said selected values to said PRBS generating section, wherein
   an output of said twelfth selector is outputted as a register value of said PRBS generating section.

7. A receiver, which receives a data signal which is first divided into packets of a predetermined number of bits, constituted as a frame of a predetermined number of packets, rearranged in the frame, divided into symbols of a predetermined number of carriers, and then energy-dispersed per frame of a predetermined number of symbols, and which comprises an energy-dispersal circuit for executing energy dispersal with respect to the data signal, the energy dispersal circuit comprising:
   a state setting section;
   a pseudo random binary signal (PRBS) generating section which includes a shift register for executing shifts in accordance with transmission bits and an exclusive-OR operator for inputting a partial output of said shift register and executing a first exclusive-OR operation thereto, wherein said exclusive-OR operator further outputs and feeds back the result to said shift register to be inputted therein, said shift register is initialized per frame by a register initial value, and which generates a pseudo random binary signal;
   an exclusive-OR circuit which executes a second exclusive-OR operation with respect to the pseudo random binary signal obtained from said PRBS generating section and the data signal; and
   a packet number calculating division which calculates a number of effective packets from a frame leading position, number of symbols from the frame leading position, transmission mode information and control information, and outputs the number of effective packets as a packet number;
   wherein said state setting section generates data of said shift register shifted in one frame from an initial state of said PRBS generating section in accordance with a transmission bit number from the initial state and provides the data to said shift register of said PRBS generating section.

8. A receiver according to claim 7, wherein said state setting section comprises:
   a cycle number calculating portion which calculates a bit shift number from the initial state based on an operated packet number from the initial state of said PRBS generating section;
   a bit divider which divides data of the bit shift number obtained by said cycle number calculating portion based on bits from LSB to MSB; and
   an intermediate value generating portion which is supplied with initialization data for initializing said shift register per frame and the divided bits of said bit divider and generates an intermediate value of said shift register to be loaded in said PRBS generating section.

9. A receiver according to claim 8, wherein said cycle number calculating portion comprises:
   a multiplier which calculates the bit shift number by multiplying the operated packet number from the initial state of said ERRS generating section by a bit number for one packet; and
   a residue operator which calculates a residue bit shift number by dividing the obtained bit number by a bit shift number corresponding to a cycle of said PRBS generating section.

10. A receiver according to claim 8, wherein said intermediate value generating portion comprises:
    $15(2^i$, i=0 to 14) bit shift operators which generate shift data obtained by executing the exclusive-OR operation with respect to a group of data from LSB to MSB thereof, respectively which is gained when a group of 15-bit data obtained by dividing a 15-bit register value to be shifted based on bits is subjected to $2^i$ bit shift in said ERRS generating section;
    a first selector which selects one of a register value obtained from the $2^0$ bit shift operator and said register initial value based on the LSB of the bit-divided data of said bit divider when said register initial value is given; and
    j-th (j=2 to 15) selectors which select one of a register value obtained from said $2^{j-1}$ bit shift operator and an output of said (j-l)-th selector based on a (j−1 )-th data from the LSB of the bit-divided data of said bit divider when the output of said (j−1)-th selector is given, wherein
    an output of said fifteenth selector is outputted as a register value of said PRBS generating portion.

11. A receiver according to claim 7, wherein said state setting section calculates a state of said PRBS generating section based on an operated packet number from the initial state of said PRBS generating section, and provides the calculation result for the shift register of said PRBS generating section.

12. A receiver according to claim 11, wherein said state setting section comprises:
    a bit divider which divides the operated packet number from the initial state of said PRBS generating section based on bits from LSB to MSB; and an intermediate value generating portion which is supplied with initialization data for initializing said shift register per unit frame and the divided bits of said bit divider and generates an intermediate value provided for the shift register of said PRBS generating section.

13. A receiver according to claim 12, wherein said intermediate value generating portion comprises:

$12(2^i$, i=0 to 11) packet shift operators which respectively execute shifts of Ps×$2^i$ when a shift amount corresponding to a shift number Ps for one packet with respect to an inputted register value is Ps;

a first selector which selects one of a register value obtained from said $2^0$ packet shift operator and said register initial value based on the LSB of the bit-divided data of said bit divider when said register initial is given; and j-th (j=2 to 12) selectors which respectively select one of a register value obtained from said $2^{j-1}$ packet shift operator and an output of a (j−1)-th selector based on (j−1)-th data from the LSB of the bit-divided data of said bit divider when the output of the (j−1)-th selector is given, wherein an output of said twelfth selector is outputted as a register value of said PRBS generating section.

14. A receiver according to claim 7, wherein said packet number calculating division calculates a number of effective packets $P_{num}$ from a frame leading position based on the number of symbols from the frame leading position, said transmission mode information and said control information by means of following expressions:

$B_{num} = M \cdot S'_x \cdot R'_x \cdot SYM$, and $P_{num} = Int[B_{num}/204]$, $B_{num}$: number of bytes from frame leading position, $P_{num}$: number of effective packet from frame leading position, M: coefficients in accordance with transmission modes, $S'_x$: coefficients based on carrier methods in X hierarchies, $R'_x$: coefficients based on convolution coding rates in X hierarchies, $NSEG_x$: number of segments in X hierarchies, and SYM: number of symbols having advanced since frame leading position, and outputs the calculation result as the packet number.

* * * * *

UNITED STATES PATENT AND TRADEMARK OFFICE
CERTIFICATE OF CORRECTION

PATENT NO. : 7,505,536 B2  Page 1 of 1
APPLICATION NO. : 11/012088
DATED : March 17, 2009
INVENTOR(S) : Tetsuya Yagi et al.

It is certified that error appears in the above-identified patent and that said Letters Patent is hereby corrected as shown below:

Column 12

In claim 4, line 13, the word "sift" should read --shift--.

Column 13

In claim 6, line 7, the phrase "Ps x i" should read --Ps x $2^i$--.

In claim 6, line 13, the word "sift" should read --shift--.

Column 14

In claim 9, line 5, the word "ERRS" should read --PRBS--.

In claim 10, line 3, "15 $2^i$(i=0 to 14)" should read --fifteen $2^i$(i=0 to 14)--.

In claim 10, line 9, the word "ERRS" should read --PRBS--.

Column 15

In claim 13, line 3, "12 $2^i$(i=0 to 11)" should read --twelve $2^i$(i=0 to 11)--.

Column 16

In claim 14, line 8, "$B_{num}=M \cdot S'_x \cdot R'_x \cdot SYM$, and" should read --$B_{num}=M \cdot S'_x \cdot R'_x \cdot NSEG_x \cdot SYM$, and--.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,505,536 B2  Page 1 of 1
APPLICATION NO. : 11/012088
DATED : March 17, 2009
INVENTOR(S) : Tetsuya Yagi et al.

It is certified that error appears in the above-identified patent and that said Letters Patent is hereby corrected as shown below:

Column 12

In claim 4, line 53, the word "sift" should read --shift--.

Column 13

In claim 6, line 19, the phrase "Ps x i" should read --Ps x $2^i$--.

In claim 6, line 25, the word "sift" should read --shift--.

Column 14

In claim 9, line 29, the word "ERRS" should read --PRBS--.

In claim 10, line 37, "15 $2^i$(i=0 to 14)" should read --fifteen $2^i$(i=0 to 14)--.

In claim 10, line 43, the word "ERRS" should read --PRBS--.

Column 15

In claim 13, line 8, "12 $2^i$(i=0 to 11)" should read --twelve $2^i$(i=0 to 11)--.

Column 16

In claim 14, line 10, "$B_{num}=M \cdot S'_x \cdot R'_x \cdot SYM$, and" should read --$B_{num}=M \cdot S'_x \cdot R'_x \cdot NSEG_x \cdot SYM$, and--.

This certificate supersedes the Certificate of Correction issued March 16, 2010.

Signed and Sealed this

Sixth Day of April, 2010

David J. Kappos
*Director of the United States Patent and Trademark Office*